3,511,120
GUN DRILL
Alfred Käser, Rieden-Nussbaumen, Switzerland, assignor to Aktiengesellschaft Brown, Boveri & Cie, Baden, Switzerland, a joint-stock company
Filed Dec. 12, 1966, Ser. No. 601,027
Claims priority, application Switzerland, Dec. 29, 1965, 18,012/65
Int. Cl. B23b 51/06
U.S. Cl. 77—68                             2 Claims

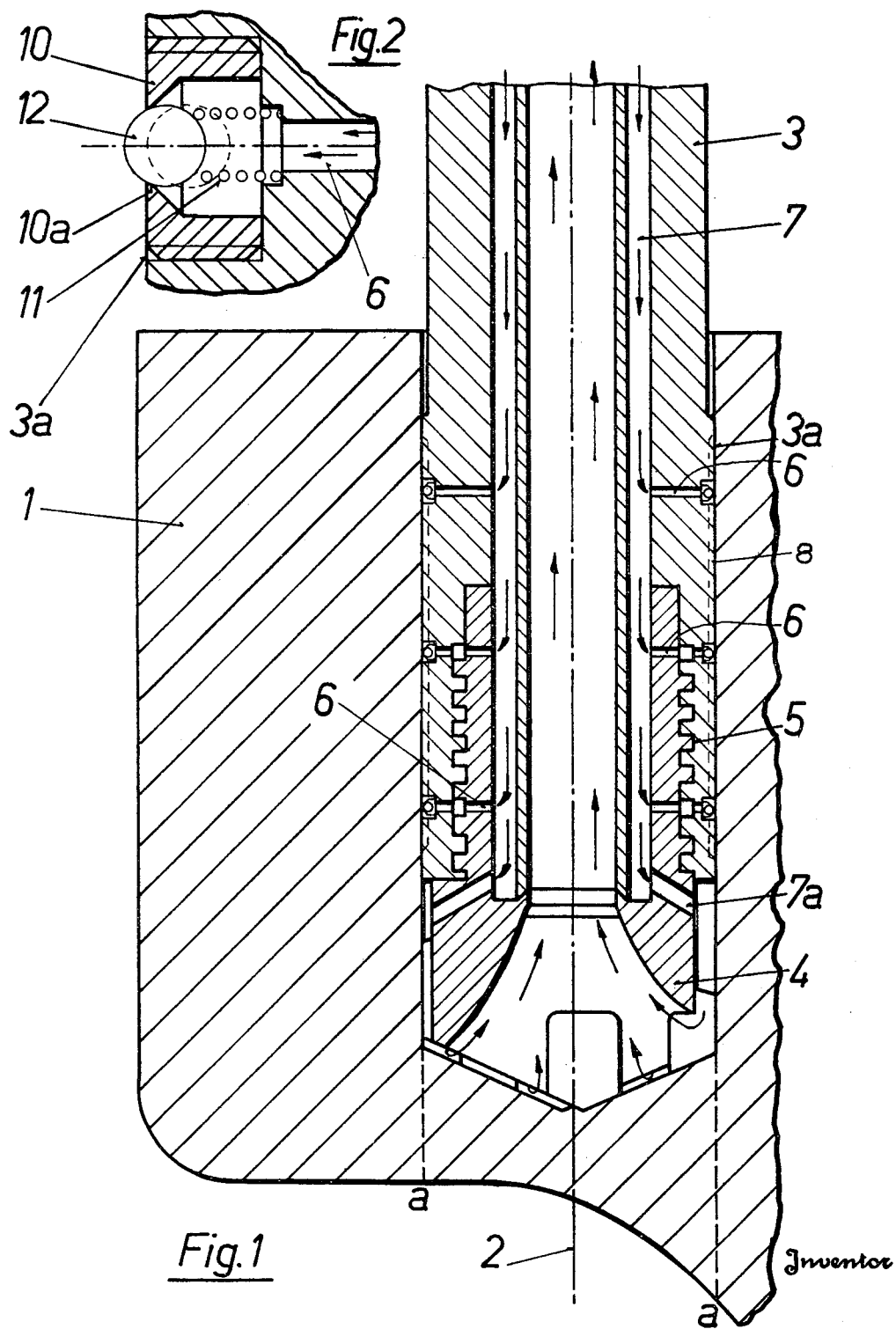

ABSTRACT OF THE DISCLOSURE

A deep hole drill comprises a drilling tool attached to the end of a drill shank, and a part of the shank immediately adjacent the drilling tool is constructed as an oil-pressurized bearing. For this purpose the pressurized oil is supplied by way of axially and circumferentially spaced radial passageways in the body of the drill shank to the surface of the shank part. Pressurized oil is also supplied directly to the drilling tool for cooling and flushing purposes, and the entire amount of the oil is returned to the surface of the drill hole through an axially extending passageway within the drill shank.

---

This invention relates to an improved construction for a gun drill, comprising a drill shank with a screwed-in drilling tool or head and pressurized axial oil feed.

Gun drills of this kind are employed for radial drilling machines, primarily for precise drilling of flange holes in workpieces of great size. In order to guide the drill, it has already been suggested that direct centering of the drill be effected on the surface which is to be pierced, by arranging the drill sleeve on the drill bit itself, pressing the same against the workpiece at the point to be drilled, and impressing it circularly into the surface of the workpiece. The drill sleeve is secured against any displacement by being impressed into the surface. A guiding method of this nature is very precise for blind holes in homogeneous material, and for through holes in the case in which the rear surface at the end of the drilled hole extends parallel to the entry surface so that the drill may emerge evenly with repect to the drilling axis. If the exit surface is oblique or curved however, there is a risk of the drill drifting from the originaly precise drilling axis when the tool begins to break through the other side of the workpiece at one side of the hole.

The present invention resides in the improvement wherein the portion of the drill shank immediately adjacent to the drilling tool is constructed in the manner of an oil-pressure bearing, pressurized oil being fed to the bearing face through axially and circumferentially spaced and substantially radially extending lateral distribution passages. Thus, the drilling tool is guided at the bore face.

This and other objects and advantages inherent in the invention will become more apparent from the following detailed description of a preferred embodiment of the improved drill and from the accompanying drawings which illustrate the construction. In these drawings:

FIG. 1 is a central section through the improved drill structure and which is shown in the process of drilling a hole through a workpiece; and FIG. 2 is a view in section, drawn to an enlarged scale, of a structural detail in the drill, this being a valve located at the oil discharge end of each of the oil distribution passages and which is opened to permit oil flow-through only when the passage is located within the bore itself.

With reference now to the drawings, FIG. 1 shows a workpiece 1, e.g. the flange of a cylinder, into which a through hole is to be drilled along the drilling axis by a drill which comprises a hollow drill shank 3 into which a drilling tool 4 is screwed by means of screw thread 5. At its leading end, i.e. in the region immediately adjacent to the tool, the drill shank has a portion 3a of increased wall thickness, which is constructed to act as an oil-pressure bearing. Radial oil passages 6 spaced axially and circumferentially are incorporated for infeed of oil laterally to the bearing surface, which passages feed a part of the pressurized oil to the bearing surface from the cutting oil inflow duct 7 through the then open valve depicted in FIG. 2. The remainder of the oil flows in an axial direction to the drilling tool 4 for cooling and flushing purposes, through the passages 7a. By means of this oil-pressure bearing, the drill shank is guided in immediate proximity to the bottom of the hole with very little play, amounting to approximately two parts per thousand only, and is thus able to withstand greater lateral forces than has hitherto been possible. The oil pressure in the bearing gap may be of static or dynamic nature. In the latter case, the drill shank is provided with oil pressure pockets or traps, in known manner. During rotation of the drill shank, the oil forced into the oil pocket 8 between the shank and the side of the hole penetrates in the form of an oil film into the gradually narrowing space of the pocket, thus engendering a high hydrodynamic bearing pressure. For a peripheral speed of approximately 70 metres/minute, a bearing capacity of at least 30 kgs./cm.$^2$ is engendered. A unilateral radial thrust is generated when the drill breaks through the curved surface $a$—$a$ of the workpiece at one side of the hole at the end of the drilling operation, but the centering of the tool is maintained by the guiding action of the walls of the hole on the drill shank close to the tool.

When the radial oil passages 6 emerge from the bore, they should be closed immediately to prevent outflow of the oil. To this end, non-return valves are incorporated in the oil passages 6 as shown in FIG. 2, for example. Each valve includes a valve seat 10 screwed into the end of the passage 6 and which has a tapered internal surface 10a. A steel ball 12 is pressed against this surface by a spring 11 to close off the valve. However, as soon as the oil passage and valve enter the drilled hole, the side of the drilled hole pushes the ball to the dotted position, opening the valve. The oil then flows between the ball and the valve seat 10a to establish the pressurized oil bearing for the drill shank bar within the hole being drilled.

I claim:

1. In a gun drill structure for drilling a hole through a workpiece from one side thereof to the other, the combination comprising a drill shank, a drilling tool secured to the end of said drill shank said drill shank and said drilling tool including a longitudinally extending duct through which pressurized drilling oil is fed to said tool, the leading end portion of said drill shank adjacent said drilling tool being provided with a plurality of axially spaced oil flowthrough passageways extending laterally from said oil feed duct through the wall of said drill shank to the exterior surface thereof to establish a pressurized oil bearing between the exterior surface of said drill shank and the wall of the hole being drilled for guiding the drill structure both during the drilling operation within the body of the workpiece and particularly after said drilling tool has broken partly through the exit side of the workpiece, and non-return valves located at the discharge end of each of said axially spaced laterally extending passageways, said non-return valves being normally closed and actuated respectively to open position in succession by contact with the wall of the drilled hole as said drilling tool progressively penetrates into the body of said workpiece.

2. A gun drill structure as defined in claim 1 wherein said bearing surface of said drill shank is provided with oil pockets which engender a supplemental hydrodynamically derived bearing pressure.

References Cited

UNITED STATES PATENTS

| | | | |
|---|---|---|---|
| 1,749,982 | 3/1930 | Nesbitt | 77—68 XR |
| 2,400,839 | 5/1946 | Perkins | 77—68 XR |
| 3,304,815 | 2/1967 | Faber | 77—68 |

FOREIGN PATENTS

| | | |
|---|---|---|
| 820,308 | 9/1959 | Great Britain. |
| 848,140 | 9/1952 | Germany. |

FRANCIS S. HUSAR, Primary Examiner

U.S. Cl. X.R.

29—106; 175—317